United States Patent [19]
Martin

[11] 3,785,360
[45] Jan. 15, 1974

[54] DEMOUNTABLE CAMP GRILL

[76] Inventor: Edward J. Martin, 4909 Fremont Ave., Minneapolis, Minn. 55409

[22] Filed: Jan. 3, 1972

[21] Appl. No.: 214,658

[52] U.S. Cl. .................................. 126/30, 126/9 R
[51] Int. Cl. ........ A47j 37/00, F24b 3/00, F24c 1/16
[58] Field of Search ....................... 126/30, 29, 9 R; 248/165, 461; 211/1.3; 29/160

[56] References Cited
UNITED STATES PATENTS

| | | | |
|---|---|---|---|
| 2,839,043 | 6/1958 | La Born | 126/30 |
| 970,342 | 9/1910 | Kurt | 126/30 X |
| 3,437,213 | 4/1969 | Ruina | 211/1.3 |
| 3,537,388 | 11/1970 | Martin | 126/30 X |
| 3,636,938 | 1/1972 | Faltersack | 126/30 |

Primary Examiner—William F. O'Dea
Assistant Examiner—Harold Joyce
Attorney—H. Dale Palmatier

[57] ABSTRACT

A demountable grill for use over a cooking fire and including support channels retained against separation and having grill rods insertable transversely through one channel in holes aligned but not normal to the channel and into the other channel; additional rods or support structure binding the channels to be relatively fixed, and a demountable and extendible horizontal rod spaced above the grill for supporting a reflector media to concentrate reflected heat upon items on the grill.

12 Claims, 14 Drawing Figures

PATENTED JAN 15 1974 3,785,360

DEMOUNTABLE CAMP GRILL

BRIEF SUMMARY OF THE INVENTION

Transportability of equipment related to camping and picnicking requires that the equipment be constructed to be quickly disassembled for collapse into small compass while being sturdy when set up so that the equipment will be able to perform the functions attributed to it and so that the equipment can be readily handled. Furthermore, such equipment should have a minimum of parts as to keep the overall weight and the likelihood of damage to a minimum.

This invention relates to a grill to be placed over a campfire for supporting pieces of meat and other food items for cooking or baking, or for supporting cooking utensils such as pots and pans containing food items for cooking or baking. The grill may be knocked down into small compass, but is sufficiently strong and rigid when assembled as to be conveniently handled and used to support food items and utensils over a cooking fire.

The rods are supported by channels at opposite ends of the rods. The rods may be run transversely through one channel in apertures which are aligned but not normal to the channel for assembly with spaced apertures in the other channel. When assembled, the ends of the rods are confined within the channel and supported in one set of apertures in each channel; and the channels and rods are shifted slightly so that the rods extend approximately normal to the channels and are no longer aligned with the other set of apertures so as to retain the rods in the channels.

A binding relationship is created upon the channels to prevent relative movement therebetween so as to stabilize the grill and prevent disassembly of the rods; and also to prevent removal of the rods through the holes provided for assembly purposes. This binding relationship upon the channels may be established between the channels and additional rods extending therebetween or supporting structure rigidly interconnecting the channels.

The channels are prevented from moving away from each other by one or more rods with hooked or bent ends. Unintended disassembly of these rods with hooked ends is prevented by the grill rods extending into and across the interior of the channels. Where a supporting structure carries the channels as cantilevers, the supporting structure also prevents disassembly of the channels and hooked rods.

BRIEF DESCRIPTION OF THE DRAWINGS

FIG. 1 is a perspective view showing the use of an assembled grill.

FIG. 2 is an enlarged section view taken at 2—2 in FIG. 1.

FIG. 4.1 is an enlarged sectional detail view taken approximately at 4.1 — 4.1 in FIG. 4 and having a portion of the rod broken away and illustrating the manner of assembly of the camp grill.

DETAILED DESCRIPTION OF THE INVENTION

Figures 3, 4, 5:
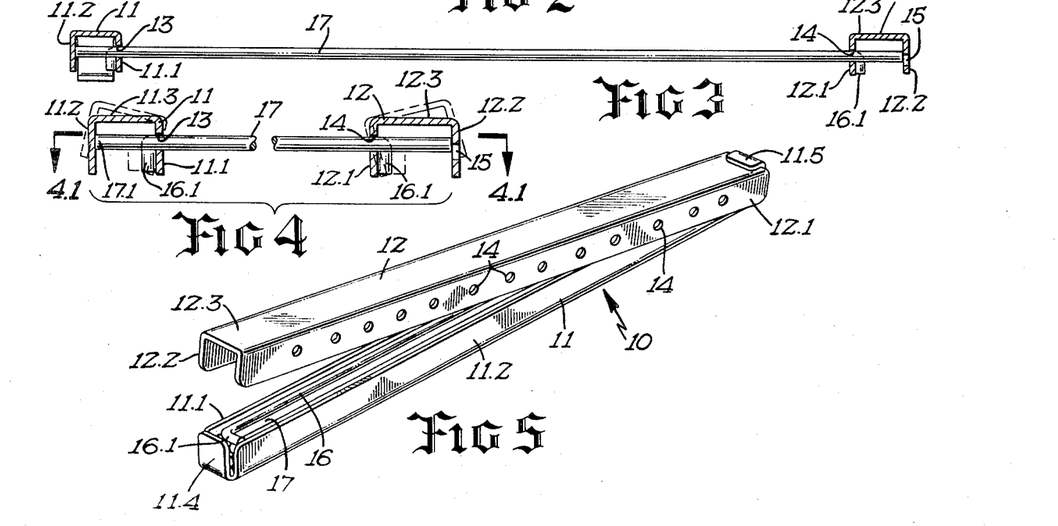
FIG. 3 is an enlarged section view taken at 3—3 in FIG. 1.
FIG. 4 is a greatly enlarged detail sectional view with portions broken away and illustrating the functional detail of the various portions of the grill.
FIG. 5 is an assembly view showing the manner in which the grill may be knocked down and assembled into small compass.

One form of the invention is shown in FIGS. 1–5, and this camp fire grill is indicated in general by numeral 10. The grill 10 is sufficiently sturdy and rigid when assembled to be supported upon a number of stones or logs so as to be carried over a camp fire and to carry the food articles thereon or to carry utensils thereon for cooking food items; and when collapsed, as illustrated in FIG. 5, the grill 10 assembles into small compass to be easily packed away and transported.

The grill 10 has a pair of elongate and rigid frame members or channels 11 and 12 which are of such a size relative to each other as to be adapted to assemble with each other as illustrated in FIG. 5 so that the channel 11 fits within the channel 12 and cooperates therewith in defining a container for confining and storing the other parts of the grill 10. Although, in FIG. 5, the channels 11 and 12 are shown slightly separated in order to illustrate the relationship and the manner in which other parts are contained therein, it will be understood that the channel 11 will be confined substantially wholly within the channel 12.

The channels 11 and 12 both have side flanges 11.1 and 12.1, respectively, which confront each other in widely spaced relation when the grill 10 is assembled. These inner side flanges 11.1 and 12.1 are provided with a plurality of regularly spaced rod-supporting apertures 13 and 14, respectively.

Each of the channels 11 and 12 also has an outer depending flange 11.2 and 12.2, respectively, and a transverse web 11.3 and 12.3 rigidly interconnecting the respective flanges. The webs 11.3 and 12.3 and the outer flange 11.2 of the channel 11 may all be imperforate.

Figures 1, 2, 41:
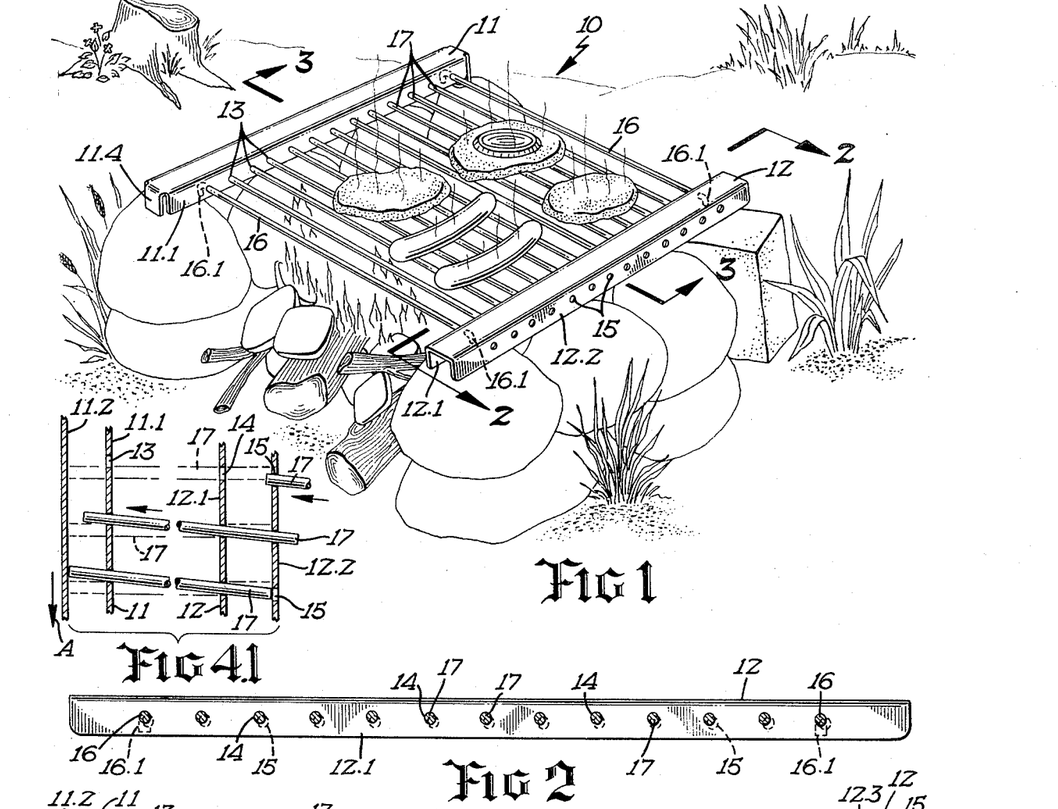

The outer flange 12.2 of the channel 12 has a plurality of regularly spaced threading apertures 15 therethrough, each of which is disposed opposite a respective aperture 14 in the inner flange 12.1, and is generally aligned therewith, but along a line which is not perpendicular to the channel 12, but which lies obliquely transversely of the channel. The relative positioning and orientation of the threading apertures 15 and the support apertures 14 in the channel 12 is readily apparent in FIGS. 2 and 4.1. The threading apertures 15 may be disposed slightly further from the web 12.2 than the apertures 14, or it might be said that the apertures 15 are slightly lower than the apertures 14 when the channel 12 is oriented horizontally as depicted in FIG. 2. All of the holes 13, 14 and 15 are approximately the same size.

The grill 10 also has a plurality of substantially rigid rods 16 and 17 extending between the channels 11 and 12 and through the rod-supporting apertures 13 and 14 of the channels when the grill 10 is in assembled condition. The rods 16 and 17 are all approximately the same size as each other and are slightly smaller than the apertures 13, 14 and 15 in the channel flanges; and there is only a slight amount of difference in the diameter of the rods as compared to the diameter of the apertures so that the rods may slide freely through the apertures during threading of the rods into the channels for assembly as illustrated in FIG. 4.1, but when the channels are tilted with respect to the rods as indicated in the dotted line position of FIG. 4, a binding relationship is created between the rods and the peripheries of the apertures through which the rods extend.

There are only two rods 16 illustrated and these rods are disposed adjacent the opposite ends of the channels 11 and 12, in the endmost apertures 13 and 14. Although the rods 16 do perform a supporting function for the food items and utensils that may be placed upon the grill, it is intended that the rod 16 retain the channels 11 and 12 against separation from each other and from the remainder of the rods 17. These retaining rods 16 have crimped or bent ends 16.1 which bear against and lie flush upon the inner surfaces of the inner flanges 11.1 and 12.1 of the channels. These crimped or bent ends 16.1 of the rods 16 are oriented at approximately 90° with respect to the main or central portions of these rods. When the channels 11 and 12 are tilted with respect to the rods 16, as into the dotted line position of FIG. 4, the ends 16.1 continue to bear against the inner flanges 11.1 and 12.1 of the channels, and cause the flanges 11.1 and 12.1 to slide, slightly, along the rods 16 and 17, and toward each other so that a somewhat increased length of each of the rods 17 is confined within the open interior of the channels 11 and 12.

The rods 17 have straight ends and are of a sufficient length, relative to the length of rods 16, so that the ends 17.1 of these rods extend entirely across the unobstructed interiors of the channels 11 and 12 and against the outer flanges 11.2 and 12.2 of the channels. When the channels 11 and 12 are tilted with respect to the rods 16 and 17 in the manner indicated in dotted lines in FIG. 4, the ends of the rods 17 will frictionally bind, in a wedging relationship, against the outer flanges 11.2 and 12.2 of the channels. This binding relationship can be established manually by bearing inwardly on the channels 11 and 12 to continuously force the flanges 11.2 and 12.2 against the ends of the rods 17 as the tilting of the channels 11 and 12 is carried out, but because of the presence of the bent ends 16.1 of the retainer rods 16, the camming action between the rod ends 16.1 and the channel flanges 11.1 and 12.1 during tilting of the channels produces the slight sliding motion of the channels along the rods 17, and this action results in the frictional binding, in a wedging action, between the ends 17.1 of the rods 17 and the outer flanges 11.2 and 12.2 of the channels, as described. No significant amount of inwardly directed manual pressure need be exerted on the channels 11 and 12 in order to effect this binding relationship.

When this binding relationship is established between the ends of rods 17, and the channels 11 and 12, an additional binding relationship may be established at the apertures 13 and 14, between the rods 17 and the inner flanges 11.1 and 12.1 at the peripheries of the apertures. This binding relationship restricts movement of the channels 11 and 12 endwise along the rods 17 and maintains the binding relationship between the ends 17.1 of the rods and the outer channel flanges 11.2 and 12.2. It has been found that, as a result of this frictional binding relation between the channels 11 and 12 and the rods 17, the assembled grill 10 has a substantial degree of rigidity, and the grill is by no means limp. Movement of the channels 11 and 12 relative to each other is prevented, and the grill 10 may be readily and easily handled and carried, either with or without food items or utensils thereon. It has also been found that it is not essential to maintain a frictional binding relationship between both of the channels 11 and 12 and the rods in order to maintain the grill 10 in substantially rigid condition; if the frictional binding relationship is only maintained between one of the channels 11 and a number of the rods 17, the grill 10 is sufficiently rigid as to be adequate for most cooking and handling purposes. When assembled, and regardless of whether a frictional binding relationship is established and maintained between the channels 11 and 12 and the rods 16 and 17, neither of the channels 11 or 12 may be accidentally disassembled from the rods because, whereas the bent ends 16.1 of the rods 16 require a relative swinging between the rods and the channels of approximately 90°0 for disengagement, the ends of the rods 17 extend entirely across the open interior of the channels 11 and 12 and prevent any substantial tilting of either of the channels 11 or 12 with respect to the rods, beyond a few degrees, so that accidental disassembly of the grill 10 is almost impossible.

In regard to the maintenance of the assembled relationship, it should be noted that it is not essential that two different retaining rods 16 be utilized in this grill 10. A single retaining rod 16 may be positioned approximately midway between the ends of the channels and extended therebetween in the fashion illustrated, and the same purposes are accomplished of preventing any unintended disassembly of the grill 10 and also causing the camming against the inner flanges 11.1 and 12.1 of the channels when they are tilted for establishing the frictional binding condition. It should further be understood that not all of the support rods 17 will have precisely the same length. These rods 17 may vary in length by a few thousandths of an inch. Because of this variance in length of the rods 17, not all of the rods may bear and wedge against the outer channel flanges 11.2 and 12.2 in a frictional binding relationship, but will be maintained in the support apertures 13 and 14 and will provide a supporting function for the food articles and utensils placed upon the grill 10. However, a number of the rods 17 having sufficient length as to bear against the outer flanges 11.2 and 12.2 of the channels will produce a sufficient frictional binding relationship to prevent relative movement between the channels 11 and 12 and to adequately rigidify the grill 10 for use and handling.

Because of the relative positioning between the support apertures 14 and the threading apertures 15 in the flanges of channel 12, the rods 17, during assembly and disassembly of the grill, will necessarily have an oblique orientation with respect to the channel 12 during threading of the rods 17 through the apertures 14 and 15. Because the spacing between the channels 11 and 12 is prefixed by the rods 16 which are first assembled with the channels, there must be some endwise movement of the channel 11 relative to the channel 12 as to properly align the support apertures 13 to receive the rods 17 being threaded through channel 12. It is necessary that the rods 17 be moved into channel 11 and against the outermost flange 11.2 in order that the opposite ends of the rods will clear the apertures 15 and be confined within the interior of channel 12.

When all of the rods 17 that are to be assembled with the channels 11 and 12 have been inserted to the extent as to clear the apertures 15 and be free of the outermost channel flange 12.2, the channel 11 will be shifted slightly in the direction of arrow A as indicated in FIG. 4.1 so as to cause all of the assembled support rods 17 to assume the dotted line positions illustrated in FIG. 4.1. When this shifting has occurred, the rods 17 are offset with respect to all of the threading apertures 15 as illustrated in the dotted line position of FIG. 4.1 and in FIGS. 2 and 4. Disassembly of the rods 17 from the channels 11 and 12 is thereby prevented. The tilting of the channels 11 and 12 in the manner described and illustrated in connection with FIG. 4 will not cause alignment between the rods 17 and the apertures 15. Of course, when the grill 10 is to be disassembled, the channels 11 and 12 may be adjusted with respect to each other into the proper position so that the rods 17 may be threaded through te apertures 15 and removed.

When all of the rods 17 have been removed from the channels, one of the channels may be tilted with respect to the rods 16 so as to slip the inner channel flange off the bent ends 16.1 of the rods 16. All of the rods may be thereafter confined within the channel 11 to be enclosed therein by the assembly of channel 12 as illustrated in FIG. 5. Channel 11 has end flanges 11.4 and 11.5 which retain the rods within the channel. In addition, the end flange 11.5 has a lip adjacent the edges of the side flanges 11.1 and 11.2 to overlie and confine the web 12.3 of channel 12 to maintain the channels 11 and 12 in assembly during storage condition. The side flanges 12.1 and 12.2 may be adjusted to grip the channel 11, or may be provided with a detent or latching means as to prevent unintended disassembly of the channels in storage condition as illustrated in FIG. 5.

Figures 6, 7, 8, 9, 10:
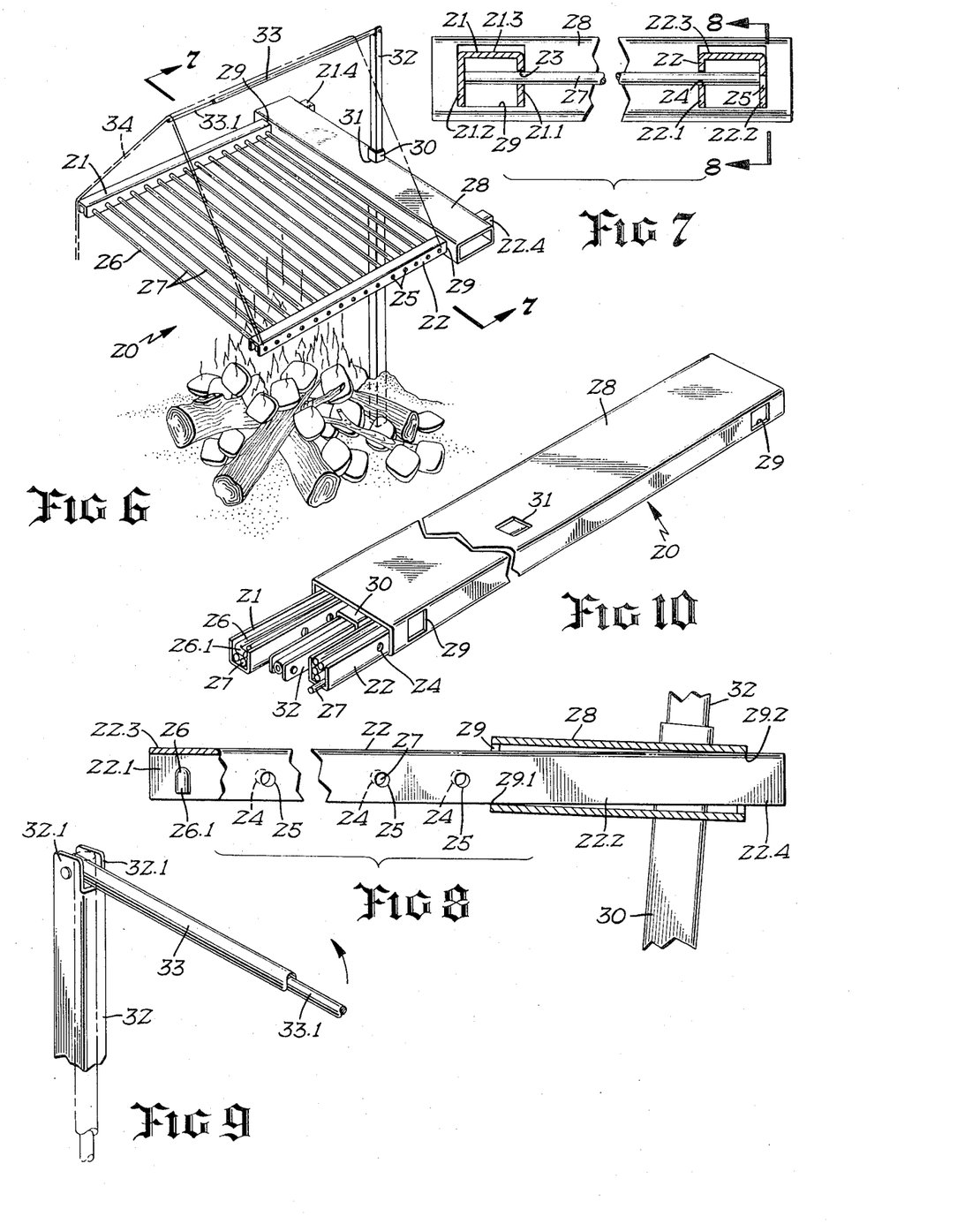
FIG. 6 is a perspective view of an alternate form of the invention.
FIG. 7 is an enlarged detail section view taken approximately at 7—7 in FIG. 6 and having portions thereof broken away.
FIG. 8 is a greatly enlarged detail section view taken approximately at 8—8 in FIG. 7 with portions broken away for clarity of detail.
FIG. 9 is a greatly enlarged perspective view of a portion of the vertically adjustable and extendible rod for supporting the reflector over the grill.
FIG. 10 is a perspective view showing the knocked down grill and support apparatus assembled into small compass.

In the form of the invention illustrated in FIGS. 6 – 10, the collapsible grill is indicated in general by the numeral 20, and is illustrated in FIG. 6 in assembled condition and in FIG. 10 in completely collapsed condition for transportation and storage.

The grill 20 has a pair of elongate frame members or channels 21 and 22, and in this form of the grill, both of the channels 21 and 22 are of identical size. The inner flanges 21.1 and 22.1 of the channels have rod-supporting apertures 23 and 24 regularly spaced along the lengths thereof. The transverse webs 21.3 and 22.3, and the outer flange 21.2 of the channels may be imperforate. The outer flange 22.2 of the channel 22 also, has a plurality of rod-threading apertures 25 regularly spaced along the length thereof and of a size equal to the sizes of rod-support apertures 23 and 24. The threading apertures 25 are slightly offset relative to apertures 24 in a direction normal to the channel 22, but the threading apertures 25 may be considered aligned with the apertures 24 in a direction obliquely transverse of the channel 22.

The grill 20 is also provided with a plurality of rods 26 and 27 extending between the channels 21 and 22 and through the support apertures 23 and 24 thereof. In this form of the invention, only a single retaining rod 26 is utilized, and this retaining rod has crimped ends 26.1 which are bent at right angles with respect to the main portion of the rod 26 so as to lie flush against the inner surfaces of the channel flanges 21.1 and 22.1. In the assembly of the grill 20, it is necessary to assemble the retaining rod 26 to the channels 21 and 22 before the remaining rods 27 are assembled.

In this form of the invention, when the rods 27 are being assembled into the grill, they will be threaded through the apertures 25 and 24, and while in this condition, will extend obliquely transversely of the channel 22 and the longitudinal position of the channel 21 must be adjusted so that the rods 27 may be received in the proper support apertures 23. When all of the rods 27 have been assembled into the channels, the channels may be adjusted longitudinally and with respect to each other so that the rods 26 and 27 swing to a position wherein they are substantially perpendicular to the channels 21 and 22 and so that the ends of rods 27 are offset from the threading apertures 25 so as to be prevented from being withdrawn.

A rigid support or crossbar 28 is provided for assembly onto the ends of channels 21 and 22 for supporting the channels over the camp fire and for preventing relative movement between the channels 21 and 22.

The crossbar 28 is of tubular steel construction and is substantially rectangular in cross section.

Horizontal transverse socket openings 29 extend through the crossbar 28 adjacent opposite ends thereof to receive the insert end portions 21.4 and 22.4 of the channels 21 and 22. The socket openings 29 are slightly larger than the channels 21 and 22 to receive and permit sliding assembly of the insert end portions of the channels into the socket openings 29. It will be recognized that the channels 21 and 22 have a cantilever relationship to the support 28, and as a result, bear against the lower periphery 29.1 of the openings 29 at the front side of the support 28, and against the upper peripheries 29.2 of the openings 29 at the rear side of the support 28. The cantilever relationship between the channels 21 and 22 and the crossbar or support 28, produces a frictional binding relationship at the locations 29.1 and 29.2 and the corresponding locations of the channels, so that the channels are restricted, by the frictional relationship with the crossbar 28, from moving endwise or longitudinally with respect to each other. As a result, the grill 20 when assembled for use as illustrated in FIGS. 6 and 8, is sufficiently rigid as to be wholly adequate for all intended uses and as to maintain the ends of rods 27 in offset relation with respect to the apertures 25 as to prevent any unintended removal or slippage of the rods in the apertures of the channels.

A tubular standard or upright support 30 to be extended into the ground and supported therefrom is provided for supporting the crossbar 28. A standard-receiving opening 31 extends transversely through the crossbar 28 and may be oriented slightly oblique with respect to the crossbar so that the standard 30 may be obliquely oriented in the ground. The opening 31 in the crossbar 28 is approximately the same size as the exterior of the standard 30 to receive the standard in tight fitting relation and to bind against the standard due to the cantilever relationship of the grill 20. The crossbar 28 and the grill 20 is thereby readily vertically adjustable along the stand 30 and may be instantly positioned to any desired vertical position and when manually released and left to be supported by the standard 30, the crossbar 28 will automatically lock itself to the standard 30 against any tendency to move downwardly. An extension channel 32 is frictionally received and carried in the tubular standard 30 and has ears 32.1 formed at its upper end to pivotally carry an extendible rod or bar 33 in horizontal position, and spaced well above the grill 20 so as to support a panel 34 (shown in dotted lines in FIG. 6) of reflective material which is also draped over the channels 21 and 22 and downwardly toward the ground to reflect heat from the fire into a baking pan carried on the grill 20. The extendible rod or bar 33 has a telescopically extensible end portion 33.1 to accommodate various widths of panels 34.

Figure 11:
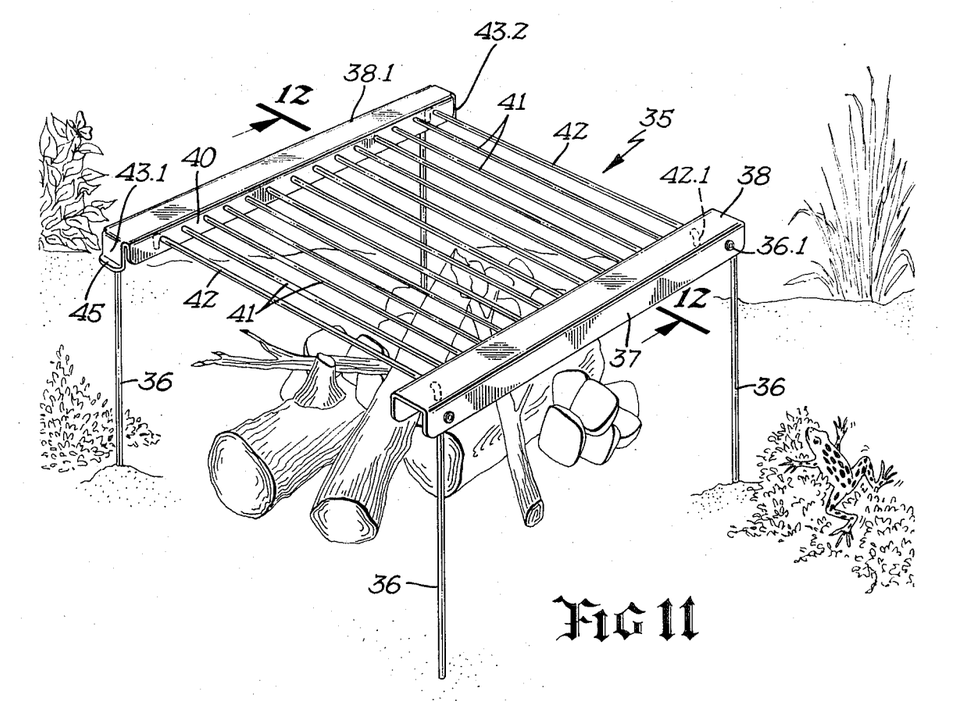
FIG. 11 is a perspective view of another modified form of the invention.
Figure 12:
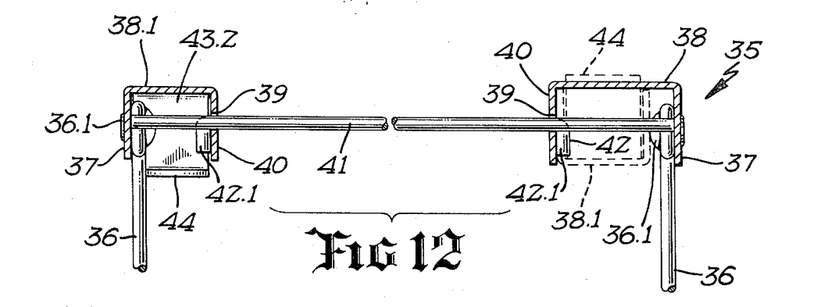
FIG. 12 is an enlarged detail section view, partly broken away, and taken at 12—12 in FIG. 11.
Figure 13:
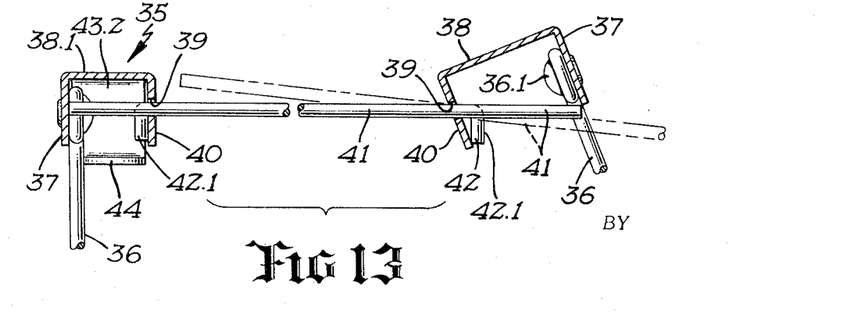
FIG. 13 is an enlarged detail section view somewhat similar to FIG. 12 and illustrating the manner of assembly and disassembly of the grill.

The form of the invention illustrated in FIGS. 11-13 is similar in many respects to the grill 10 of FIGS. 1-5.

The grill 35, is different from grill 10 of FIGS. 1-5, principally in the addition of the support legs 36, the elimination of rod threading apertures in the outside flange 37 of the channel 38, the slight enlargement of the rod support apertures 39 in the inner flange 40 of the channel 38 to permit tilting of the channel 38 in the manner illustrated in FIG. 13 as to permit tilting of the channel 38 in the manner illustrated in FIG. 13 as to permit inserting the rods 41 through the apertures 39 and beneath the edge of the outer flange 37 of the channel. In addition, the relation between the support rods 41 and the retaining rods 42 is such that the ends of the straight rods 41 frictionally bear against the outer flanges 37 of the channels 38 and 38.1 while these channels are oriented flat or normal with respect to the rods 41, 42 and as the retaining rods 42 retain the channels 38 and 38.1 in predetermined spacing from each other.

The legs 36 are swingably mounted on the outside flanges 37 of the channels by means of large head rivets 36.1, and when the grill is disassembled for storage, the legs 36 will swing into the space within the respective channels.

It will be noted that the crimp or bent ends 42.1 of the retaining rods 42 are accurately formed so as to retain the inner flanges 40 of the channels at predetermined spacing with each other. The length of the support rods 41 is accurately determined so that the terminal ends of the rods 41 will frictionally engage the outside flanges 37 of the channels when the channels 38 and 38.1 lie flat and substantially parallel to the rods. It will be understood that even though not all of the rods 41 are extremely accurately cut as to length, the frictional engagement is only necessary between a few of the rods 41 and the outside flanges 37 of the channels to establish and maintain the frictional relationship which binds the whole grill together when it is assembled as illustrated in FIG. 11 so that it is very sturdy to hold the usual cooking utensils that are used over a campfire.

The channel 38.1, which is somewhat narrower than channel 38, has end flanges 43.1 and 43.2 which substantially entirely close the ends of the channel 38.1 so that all of the support and retainer rods 41 and 42 may be confined and retained in the channel 38.1 as the grill is taken apart for storage. The end flanges 43.1 and 43.2 prevent the rods from sliding endwise out of the channel.

In FIG. 12, the manner of assembly of the channel 38.1 into the channel 38 is illustrated in dotted lines. Of course, the legs 36 attached to channel 38.1 have been swung into the channel for assembly with the channel 38. The end flange 43.2 has an inwardly turned lip 44 to confine the web of channel 38 when in assembly therewith. The end flange 43.1 has an outturned lip 45 which protrudes very slightly beyond the end of channel 38 when the channels have been assembled together to facilitate ready and easy gripping of the lip 45 to effect disassembly of the channels 38 and 38.1 from each other when it is desired to set up the grill.

It will be understood that the legs 36 are of rod-type material and have loops formed in their upper ends for mounting on the rivets 36.1.

In the use and assembly of this grill 35, the retaining rods 42 are first assembled with the channels 38, 38.1. Then, as illustrated in FIG. 13, one of the channels, such as 38 in this illustration, is tipped so that the straight support rods 41 can be passed beneath the outer flange and through the support apertures 39 of the inner flanges 40. This threading of the rods 41 is illustrated by the dashed lines in FIG. 13. When all of the retainer rods 41 have been assembled into the channels, and substantially into the full line position illustrated in FIG. 13, the channel which has been tilted will be returned to its normal orientation as illustrated in FIG. 12, and as this channel 38 is tipped from the oblique position to the position horizontal with and level with the rods 41, the outside flange 37 frictionally engages the ends of the rods 41 and cams against these rods in a frictional relationship and causes the rods to be pressed firmly and in a friction fit against the outside flange of the opposite channel. When the channel being tilted has returned to the level or parallel relation to the rods 41, as illustrated in FIG. 12, both ends of each of the rods 41 are retained tightly, by friction relationship, against the outside flanges 37 of the channels, and the channels are prevented from separating by the retainer rods 42. The result is that the grill 35 becomes very sturdy and will stand without any significant movement on the legs 36 which are pressed into the ground. The grill 35 continues to be very serviceable, even though one or two or several of the rods 41 become slightly bent or warped because it has been found that only a few of the rods are required to frictionally engage the outside flanges of the channels in order to make the grill 35 a sturdy structure.

Disassembly of the grill 35 is a simple matter. One of the channels is tipped slightly so that the ends of the rods are exposed beneath the edge of the outside flange and then the rods can be slipped out and finally the support rods 42 can be disassembled from the channels.

It will be seen that I have provided a novel and improved camp fire grill with apertured channels supporting rods extending therebetween and when assembled with the rods provides a sturdy and substantially rigid assembly adequate for serving all the intended uses during cooking over a camp fire and handling. The rods are maintained in assembly with the channel by the retaining rods and by the crossbar 28 through which the channels extend in one form of the invention. The channels are prevented from moving relative to each other in one form of the invention by the crossbar acting upon the channels in a frictional binding relation which permits, when the pressure establishing the binding relationship is relieved, a quick and ready release. In the other form of the invention, the channels are maintained in rigid relation with each other by certain of the rods which are in a frictional binding relationship with the channels while other of the rods may be slightly loose within the support apertures, but are held in position against separation by the rigid relationship between the channels.

What is claimed is:

1. A camp grill comprising:
a pair of rigid channels opposite each other in widely spaced relation, each of said channels having an inner flange and an outer flange lying parallel thereto and a web interconnecting said flanges, and each of said channels also having an open, unobstructed interior between the flanges, the inner flanges of said channels confronting each other in widely spaced relation and having a plurality of support apertures therein,
means retaining said channels against movement away from each other and including a retaining rod extending between said channels and through apertures thereof and into the interior thereof, said rods having means on the ends thereof to engage and retain said channels in assembly therewith and against movement away from each other, and
a plurality of support rods extending between said channels and snugly through said support apertures and transversely across said open interior, the ends of said support rods being disposed within the interior of said channels and bearing against said outer flanges of said channels under pressure to produce a frictionally binding relation with the channels whereby to provide against unintended disassembly of the rods and channels and to rigidify the rods with respect to the channels.

2. The camp grill according to claim 1 and one of said channels having a transverse size smaller than the open interior of the other of the channels to be received and stored therein.

3. The camp grill according to claim 1 wherein said retaining rod has crimped ends bent at approximately right angles with respect to the rod and bearing against the inner side of the inner flanges to produce sliding of the channels along the support rod when the channels are tilted with respect to the support rods.

4. A camp grill comprising:
a pair of rigid channels opposite each other in widely spaced relation, each of said channels having an inner flange and an outer flange and a web interconnecting said flanges and each of said channels also having an open and unobstructed interior between the flanges, the inner flanges of the channels confronting each other and having a plurality of rod support apertures therein, the outer flange of one of said channels having a plurality of rod threading apertures, each disposed opposite a respective support aperture, each of the rod threading apertures being aligned with the corresponding support aperture in a direction transversely and obliquely of the channel,
means retaining said channels against movement away from each other, and
a plurality of support rods extending between said channels and through said support apertures of the channels and transversely across the open interiors thereof, said support rods being disposed out of alignment with said threading apertures to be retained in assembly with the channels, and said channels being movable relative to each other to align the support rods with said threading apertures to facilitate removal thereof and disassembly of the rods and channels.

5. The camp grill according to claim 4 wherein the ends of said support rods bearing tightly against the outer flanges of said channels to rigidify the rods with respect to the channels.

6. A camp grill comprising:
a pair of rigid channels opposite each other in widely spaced relation, each of the channels having an inner flange and an outer flange and a web interconnecting said flanges, and each of said channels also having an open and unobstructed interior between the flanges, the inner flanges of the channels confronting each other and having a plurality of support apertures therein,
means retaining said channels against movement away from each other,
a plurality of support rods extending between said channels and through said support apertures and transversely across the open interiors of said channels, the ends of said support rods confronting the outer flanges of said channels whereby to provide against unintended disassembly of the rods and channels, said rods having a loose fit with respect to the support apertures of one of the channels to permit tilting of the channel with respect to the rods and to swing the outer flange thereof transversely of the rods and out of confronting relation with the ends of the rods whereby to permit the rods to be withdrawn from the support apertures and disassembled with respect to the channels, and the ends of said rods bearing tightly against the outer flanges of the channels in a frictionally binding relation to rigidify the rods with respect to the channels.

7. A camp grill comprising:
a pair of rigid channels opposite each other in widely spaced relation, each of said channels having an inner flange and an outer flange and a web interconnecting said flanges, and each of said channels also having an open and unobstructed interior between the flanges, the inner flanges of the channels confronting each other and having a plurality of support apertures therein, the outer flange of one of the channels having a plurality of rod-threading apertures each disposed opposite a respective support aperture, each of the threading apertures and the corresponding support aperture being aligned with each other in a direction transversely and obliquely of the channel,
means retaining said channels against movement away from each other, and
a plurality of support rods extending between said channels and through said support apertures and transversely across the open interiors of said channels, the ends of said support rods confronting the outer flanges and out of alignment with said rod-threading apertures, the channels being movable relative to each other to align the support rods with said rod-threading apertures to facilitate removal of the rods and disassembly of the grill.

8. The camp grill according to claim 7 and means frictionally bearing against said channels to restrain longitudinal movement thereof to retain the support rods out of alignment with the rod-threading apertures.

9. The camp grill according to claim 12 and said means frictionally bearing against the channels including additional rods with ends frictionally bearing against the outer flanges of the channels and rigidifying the channels and support rods relative to each other.

10. The camp grill according to claim 12 and said means frictionally bearing against said channels including a rigid bar extending between the channels and having horizontal socket openings in which the ends of the channels are received and secured whereby to restrain movement of the channels with respect to each other and maintain the support rods out of alignment with the rod threading apertures.

11. A camp grill comprising:
a pair of rigid channels opposite each other in widely spaced relation, each of said channels having a pair of parallel flanges and a web interconnecting said flanges and also having an open and unobstructed interior between the flanges, one flange of each channel confronting the other channel and having a plurality of support apertures therein, the other flange of one of the channels having a plurality of rod-threading apertures therein aligned with said support apertures in transversely, but oblique relation relative to the channel,
one of said channels being of a reduced cross-sectional size relative to the other channel to facilitate assembly of the channels together to create a storage receptacle, one of the channels having flanges across the open ends thereof for retaining the contents of the receptacle so formed;
a pair of retaining rods extending between the opposite channels and said rods being respectively disposed adjacent the opposite ends of said channels, said retaining rods extending through support apertures of said channels and being bent at right angles within the channels to prevent separation of the channels away from each other; and
a plurality of substantially rigid support rods extending between said channels and through said support apertures and transversely across said open interiors of the channels, said support rods being approximately the same size as the apertures and said rods lying adjacent the web of the channels, the ends of said rods being disposed out of alignment with said threading apertures, and said channels being tilted slightly with respect to the rods to wedge the ends of the rods against the outer flanges of the channels and rigidify the relation between the rods and channels.

12. A camp grill comprising:
an upright hollow standard to be supported from the ground;
a horizontal and rigid crossbar having an aperature transversely therethrough and of a size closely conforming to the size of said standard and receiving the standard therethrough in close fitting relation, said crossbar also having opposite ends and a pair of horizontal openings therethrough respectively disposed adjacent the opposite ends;
a pair of elongate channels each extending through a respective horizontal opening in the crossbar and said channels being disposed in widely spaced and confronting relation with each other, each of said channels having an inner depending flange confronting the opposite channel and having a plurality of rod support apertures therein, one of said channels also having a plurality of threading apertures in the outer depending flange, each of said support apertures having alignment with a corresponding threading aperture in transverse but oblique relation with the channel;
a retaining rod extending between said channels in widely spaced relation with respect to the crossbar and extending through corresponding support apertures in said channels, said retaining rod having crimped ends bent at approximately 90° bearing against the interior of said channel flanges and retaining said channels against divergent movement;
a plurality of support rods extending between said channels and said rods having ends projecting through the support apertures of the channels and into the unobstructed interior of the channels, said support rods normally being out of alignment with said threading apertures, but being swingable into alignment with the threading apertures for removal therethrough upon relative endwise movement of said channels in the openings of said crossbar;
an extendible and retractable horizontal support bar spaced above said rods and approximately midway between said channels for supporting a reflective foil draped thereover and over said channels for reflecting heat onto the articles carried by the rods; and
a telescoping channel inserted into the hollow standard and being pivotally connected to said extendible bar for supporting the same and receiving said bar, upon collapse, into small compass within the channel.

* * * * *

UNITED STATES PATENT OFFICE
CERTIFICATE OF CORRECTION

Patent No. 3,785,360    Dated January 15, 1974

Inventor(s) Edward J. Martin

It is certified that error appears in the above-identified patent and that said Letters Patent are hereby corrected as shown below:

In claim 9, please delete "12" and substitute -- 8 --.

In claim 10, please delete "12" and substitute -- 8 --.

Signed and sealed this 25th day of June 1974.

(SEAL)
Attest:

EDWARD M. FLETCHER, JR.
Attesting Officer

C. MARSHALL DANN
Commissioner of Patents